D. F. EBBERT.
MAGNETO GUARD.
APPLICATION FILED APR. 24, 1911.
1,004,758.
Patented Oct. 3, 1911.
3 SHEETS—SHEET 1.
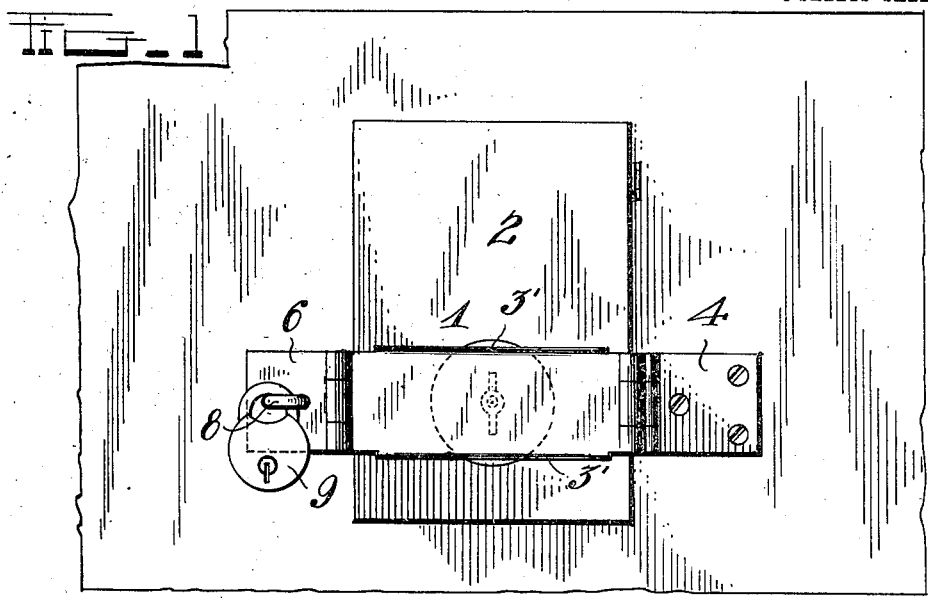
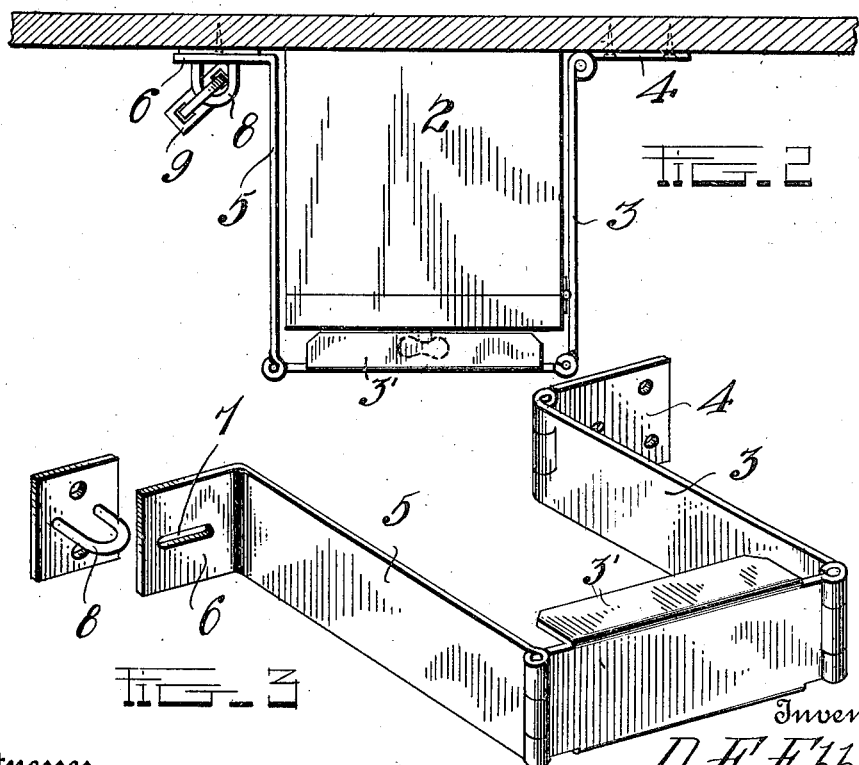
Witnesses
C. P. Hardy
O. B. Hopkins
Inventor
D. F. Ebbert
by H. B. Willson & Co.
Attorneys

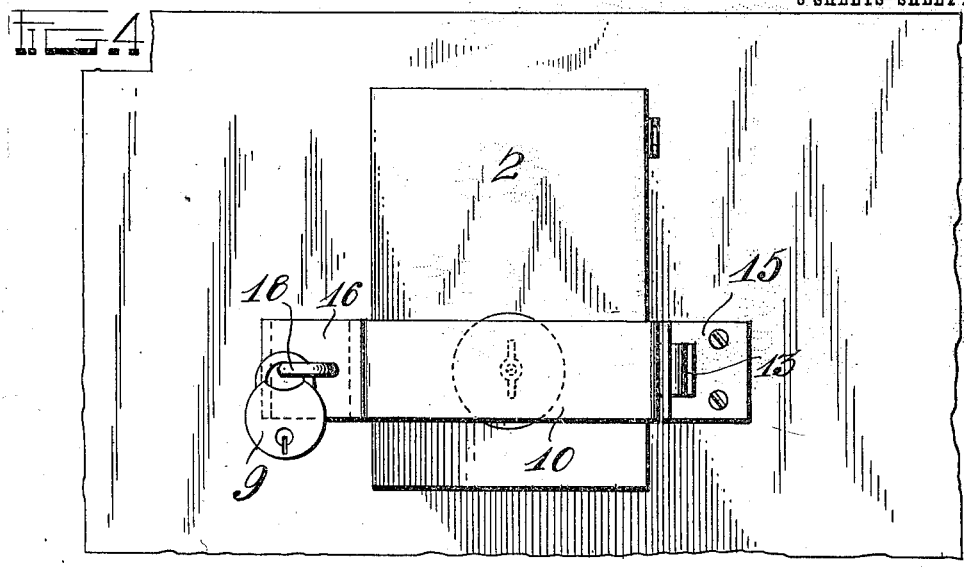
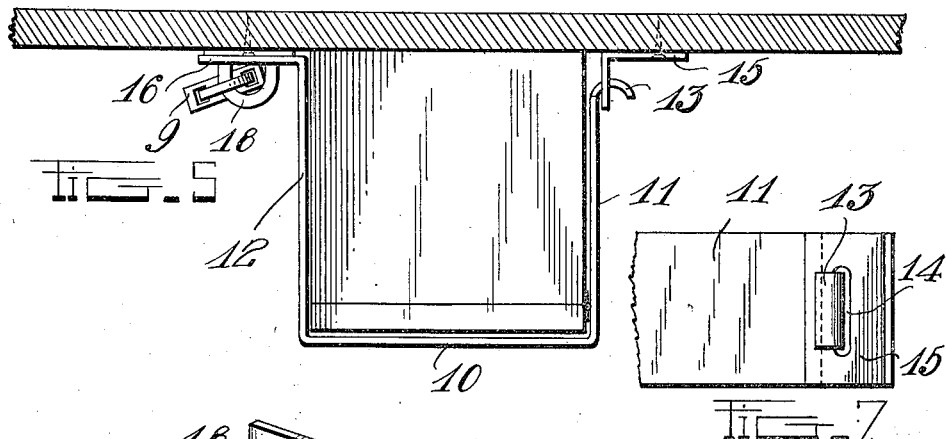
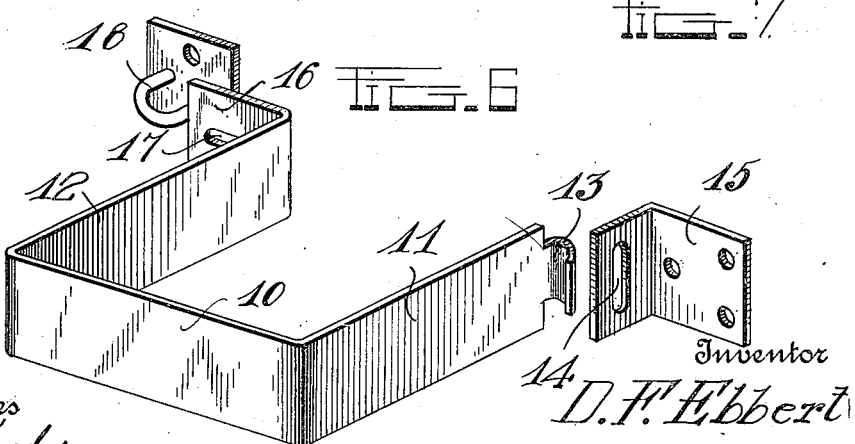

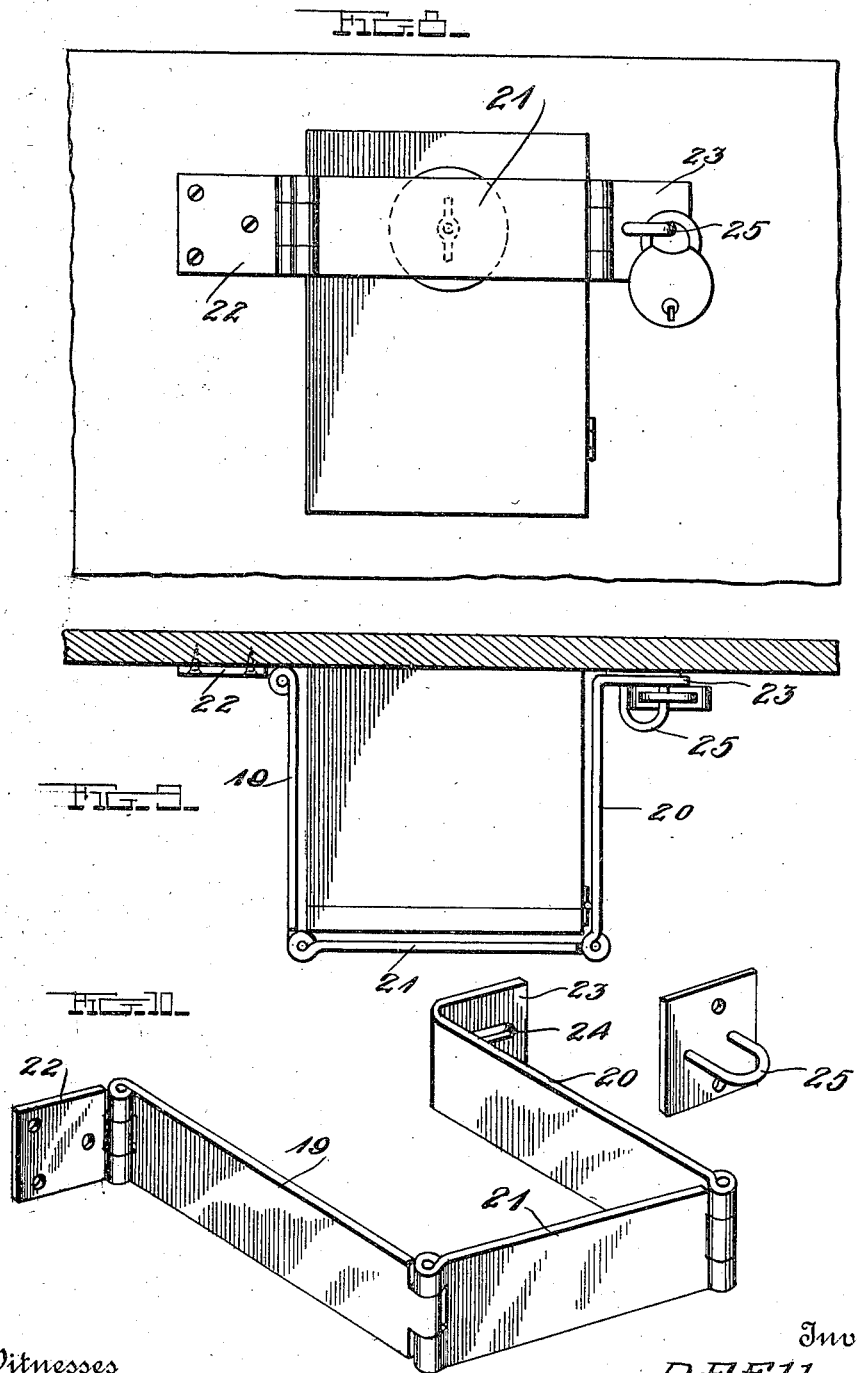

UNITED STATES PATENT OFFICE.

DANIEL F. EBBERT, OF WHEELING, WEST VIRGINIA.

MAGNETO-GUARD.

1,004,758.  Specification of Letters Patent.  Patented Oct. 3, 1911.

Application filed April 24, 1911.  Serial No. 623,106.

*To all whom it may concern:*

Be it known that I, DANIEL F. EBBERT, a citizen of the United States, residing at Wheeling, in the county of Ohio and State of West Virginia, have invented certain new and useful Improvements in Magneto-Guards; and I do declare the following to be a full, clear, and exact description of the invention, such as will enable others skilled in the art to which it appertains to make and use the same.

This invention relates to improvements in magneto guards.

One object of the invention is to provide means whereby the magneto of a motor vehicle may be guarded to prevent an unauthorized person from inserting a key therein or otherwise tampering with the same.

Another object is to provide a guard of this character which may be hinged to a suitable part of the vehicle or detachably connected thereto and removed when desired.

With these and other objects in view, the invention consists of certain novel features of construction, combination and arrangement of parts as will be more fully described and particularly pointed out in the appended claims.

In the accompanying drawings: Figure 1 is an inner side view of an automobile dash board and magneto coil box showing the application of the invention; Fig. 2 is a horizontal sectional view of the dash board showing the magneto box and guard in top plan; Fig. 3 is a detail perspective view of the guard removed from the dash board and box; Fig. 4 is a view similar to Fig. 1 showing a modified construction of the guard; Fig. 5 is a horizontal sectional view of the dash board showing a top plan view of the box and guard; Fig. 6 is a detail perspective view of the guard removed and the parts separated; Fig. 7 is a side view of a portion of one end of the guard plate and the keeper for attaching this end of the guard to the dash board of the vehicle. Fig. 8 is a view similar to Fig. 1 showing another modified construction and arrangement of the guard; Fig. 9 is a horizontal sectional view of the dash board showing a top plan view of the box and guard as arranged in Fig. 8. Fig. 10 is a detail perspective view of the guard shown in Figs. 8 and 9.

Referring more particularly to the first three figures of the drawing, 1 denotes my improved guard which is shown in these figures as being formed of a series of metal plates which are hinged together and are of sufficient length to inclose three sides of a magneto coil box 2. One side plate or member 3 is hinged at its inner end to an attaching plate 4 secured to the dash board of the vehicle. The inner end of the opposite side piece 5 is bent at right angles to form an attaching flange 6 having therein a slot 7 adapted to receive a staple 8 secured to the dash board near the opposite side of the magneto box. Any suitable form of combination or key operated lock 9 may be engaged with the staple thereby securely fastening the guard in position around the magneto box and over the key hole therein thus preventing any one from inserting a key in the box or otherwise tampering with the same. If desired the central plate or member of the guard may have formed on its upper and lower edges inwardly projecting flanges 3' whereby the guard is adapted to cover the outer end of the key when left in the magneto box either by accident or intention thus preventing any one from tampering with the key.

In Figs. 4, 5, 6, and 7 of the drawings is shown a slightly modified construction and arrangement of the guard the same being shown in this instance as formed from a single metal strip 10 having its ends bent at right angles to form the side members 11 and 12 of the guard. When thus formed the guard is adapted to be engaged with the box over the key hole therein and on the inner end of the member 11 is formed a reduced tongue or hook 13 which is adapted to be engaged with a slot 14 formed in a right angular keeper plate 15 secured to the dash board near one side of the magneto box as shown. On the inner end of the opposite member 12 of the guard is formed a right angular fastening flange 16 having therein a slot 17 which is adapted to receive a staple 18 secured to the dash board near the opposite side of the magneto box from the keeper plate 15. With the staple 18 is adapted to be engaged any suitable form of combination or key operated lock whereby the guard is securely fastened in position around the box. By thus constructing the guard the same may be readily removed when desired and placed in a tool box or other out of the way position.

In Figs. 8, 9, and 10 is shown a guard constructed similarly to the guard shown in Figs. 1, 2, and 3 of the drawings. In the last form of guard, however, it will be noted that the position of the same is reversed from that shown in the first form of the device, or, in other words, that the hinge of the guard is arranged on the left hand side of the magneto box, while the locked end of the guard is arranged on the right hand side. It will also be noted in this last arrangement of the guard that the key hole of the box which is protected by the guard is arranged at the upper end of box and that the guard is correspondingly arranged to cover the key hole.

The guard shown in the last figures of the drawings comprises side plates 19 and 20, the outer ends of which are connected together by a front plate 21. The inner end of the side plate 19 is hinged to an attaching plate 22 which is suitably secured to the dash board of the vehicle. The inner end of the side plate 20 is bent at right angles to form an attaching flange 23 having therein a slot 24 adapted to receive a staple 25 and to be fastened by a lock in the same manner as the guard shown in the first figures of the drawing. In the last form of the guard, it will be noted that the flanges on the upper and lower edges of the front plate 21 are omitted and that said plate is adapted to fit closely against the upper side of the magneto box over the key hole therein.

My improved guards may be constructed of any suitable material and it will be understood that the same are to be constructed to fit various styles and shapes of magneto boxes whereby an unauthorized person will be deterred from inserting a key in the magneto and thus be enabled to run the vehicle.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. A guard of the character described comprising a frame, said frame comprising front and side plates adapted to be secured around a magneto box over the key-hole therein and upper and lower guard flanges formed on one of said plates whereby the key to the box will be protected when the guard is in place.

2. A guard of the character described comprising a bracket having a slot, and a staple, the bracket and staple being securable to the dash board on opposite sides of a magneto box, two side members and a front member arranged to embrace the magneto box, one side member terminating in a reduced curved end to engage in the slot in the bracket, and the other side member terminating in a right angle flange provided with a slot to receive the staple.

3. The combination with a dash board provided with a right angled bracket having a slot in the projecting member thereof, a staple, and a magneto box secured between the bracket and staple, of a guard comprising right angularly disposed side and front members embracing the magneto box, a reduced hook end on one side member engaging in the slot in the bracket, and a right angle flange on the other side member having a slot receiving the staple.

4. The combination with a dash board provided with a projecting staple and a magneto box, of a guard comprising a plate secured to the dash board at one side of the box, a side member hinged to the plate, a front member hinged to the side member, a second side member hinged to the front member, and a right angle flange on the free end of the second side member provided with a slot receiving the staple.

In testimony whereof I have hereunto set my hand in presence of two subscribing witnesses.

. DANIEL F. EBBERT.

Witnesses:
H. A. SEABRIGHT,
LESTER L. COWAN.

---

Copies of this patent may be obtained for five cents each, by addressing the "Commissioner of Patents, Washington, D. C."